United States Patent [19]
Hawker et al.

[11] 3,753,044
[45] Aug. 14, 1973

[54] PHASE FIRING CIRCUITS

[75] Inventors: Collin John Hawker, Broadmayne, near Dorchester; Wilfred Roy Curle, Martock; Harold David Read, East Coker, all of England

[73] Assignee: Westland Aircraft Limited, Yeovil, Somerset, England

[22] Filed: June 19, 1972

[21] Appl. No.: 263,952

[30] Foreign Application Priority Data
July 5, 1971   Great Britain.................. 31,479/71

[52] U.S. Cl........ 317/33 SC, 307/133, 307/252 UA
[51] Int. Cl. ........................................... H02h 7/22
[58] Field of Search ..................... 317/11 A, 33 SC; 307/133, 252 UA; 323/2 S

[56]   References Cited
UNITED STATES PATENTS
3,284,690   11/1966   Naber................................. 307/133
3,373,290   3/1968   Baker................................. 307/133
3,577,177   5/1971   Wilson................................. 323/2 S Primary Examiner—James D. Trammell
Attorney—Roberts B. Larson, Ross F. Hunt, Jr. et al.

[57]   ABSTRACT

A control circuit for switching single or polyphase electrical supplies, wherein actuation of a single pole switch energises transformer means which control thyristor means adapted to supply electrical load means from a source of alternating current, the electrical load means being electrically connected to said alternating current as the phase voltage is at or near zero volts, in polyphase systems the transformer means controlling thyristor in preceding or succeeding phases, and each phase having a transformer means and thyristor means.

15 Claims, 10 Drawing Figures

FIG.6
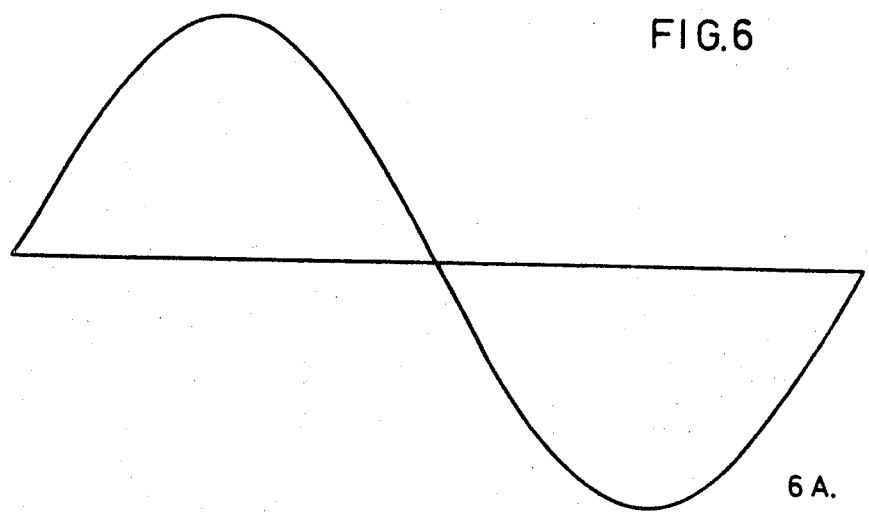
6 A.
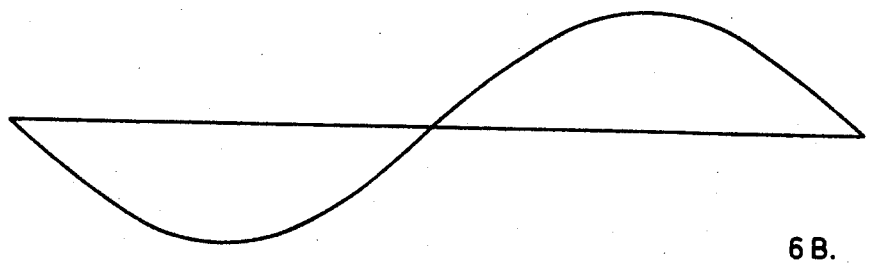
6 B.
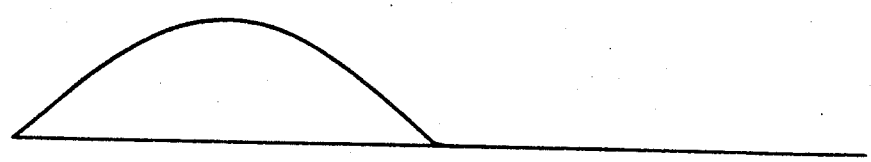
6 C.
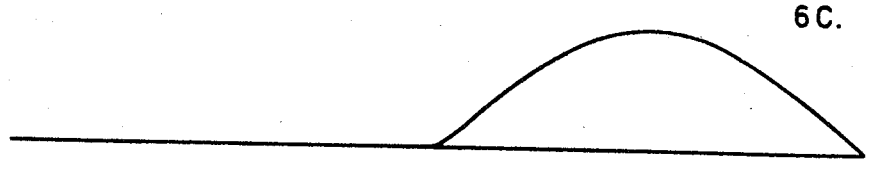
6 D.

PHASE FIRING CIRCUITS

This invention relates to a method of controlling single and polyphase electrical supplies applied to external loads, and more specifically to modulation of electrical power to said external loads. Hitherto, switching has been accomplished using relay contacts in each phase, wherein suppression of R/F interference has been a major problem, or by complicated electronic circuitry in an endeavour to reduce R/F interference in the switching operation. This invention, however, provides a switching means wherein the initial switching is only in one phase, the circuitry is simple, and R/F interference minimal, the invention being suitable for either single or polyphase supplies.

According to the invention we provide a control circuit for switching single and polyphase electrical supplies wherein the excitation of firing means controls thyristor means adapted to supply electrical load means from a source of alternating current, said electrical load means being electrically connected to said electrical supplies at or near zero volts, and wherein said single and polyphase electrical supplies are switched by single pole switching means.

Figure 1:
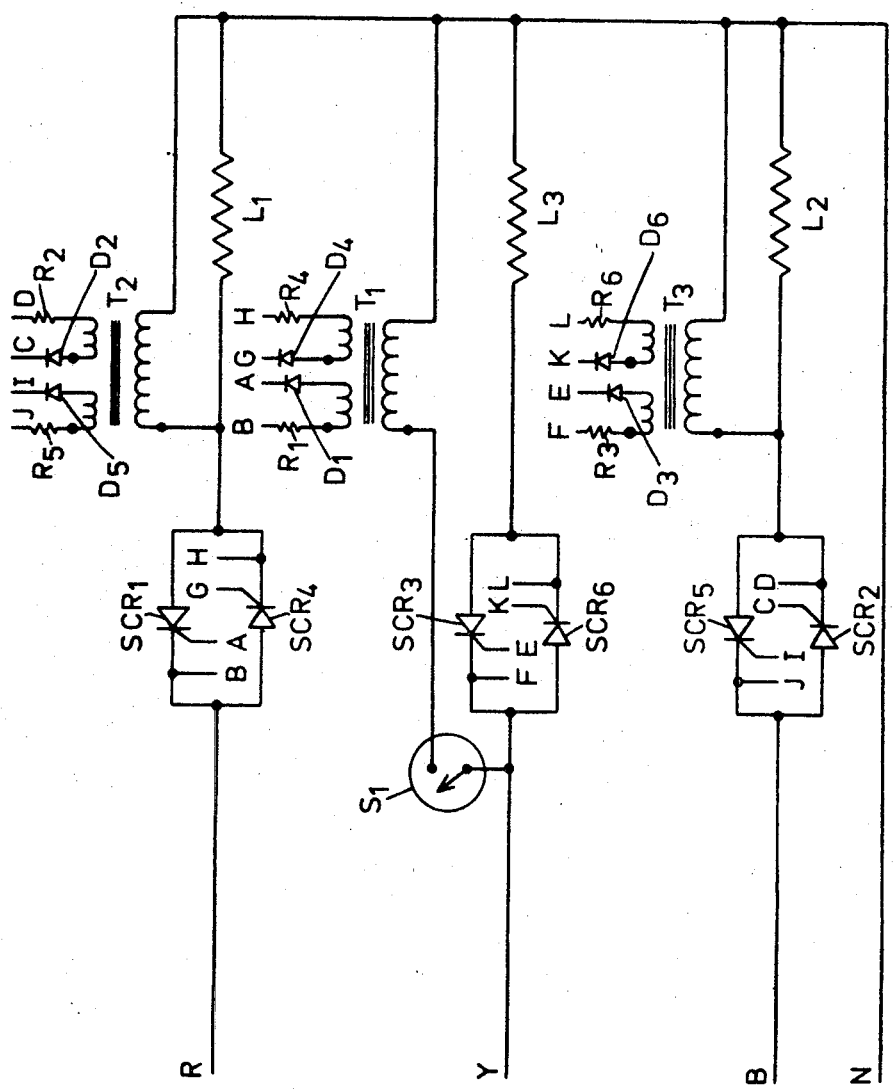
Figure 2:
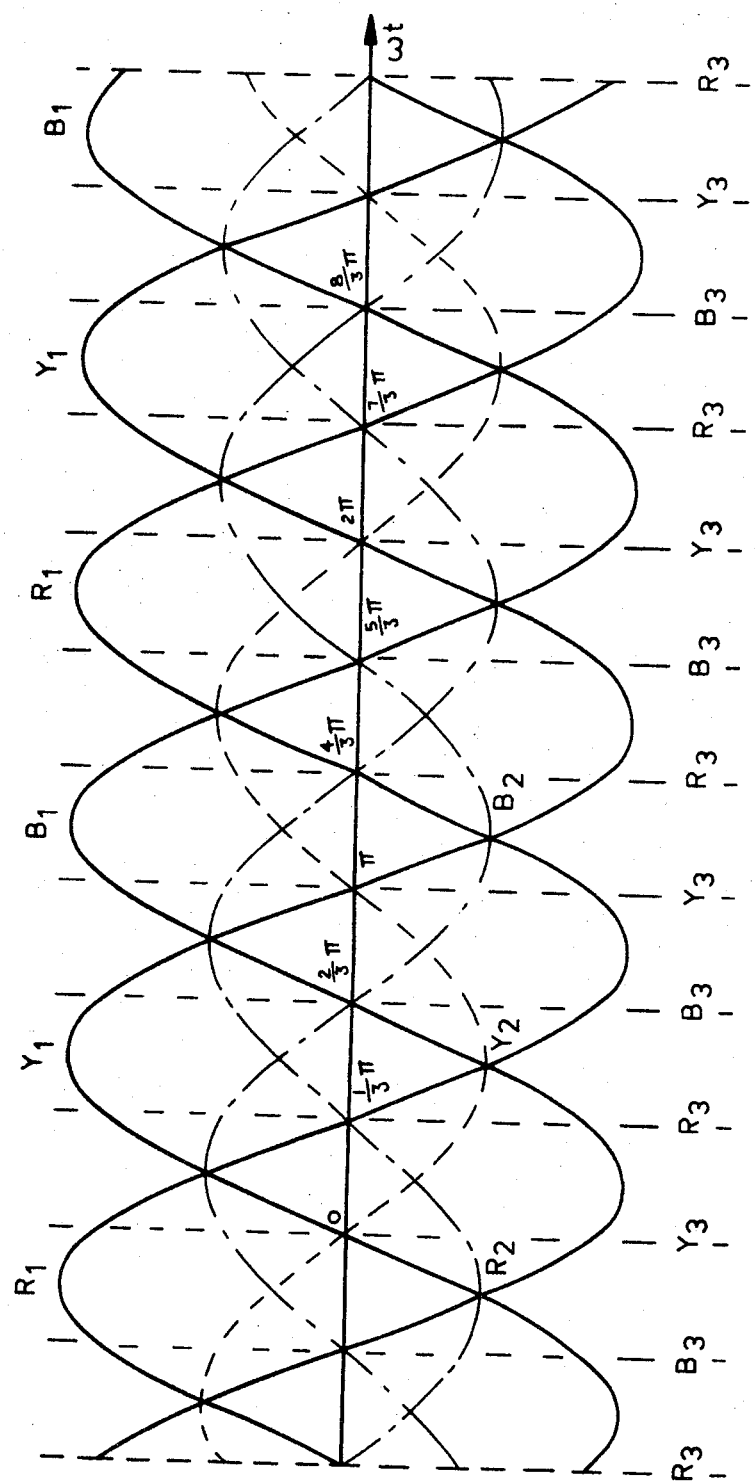
Figure 3:
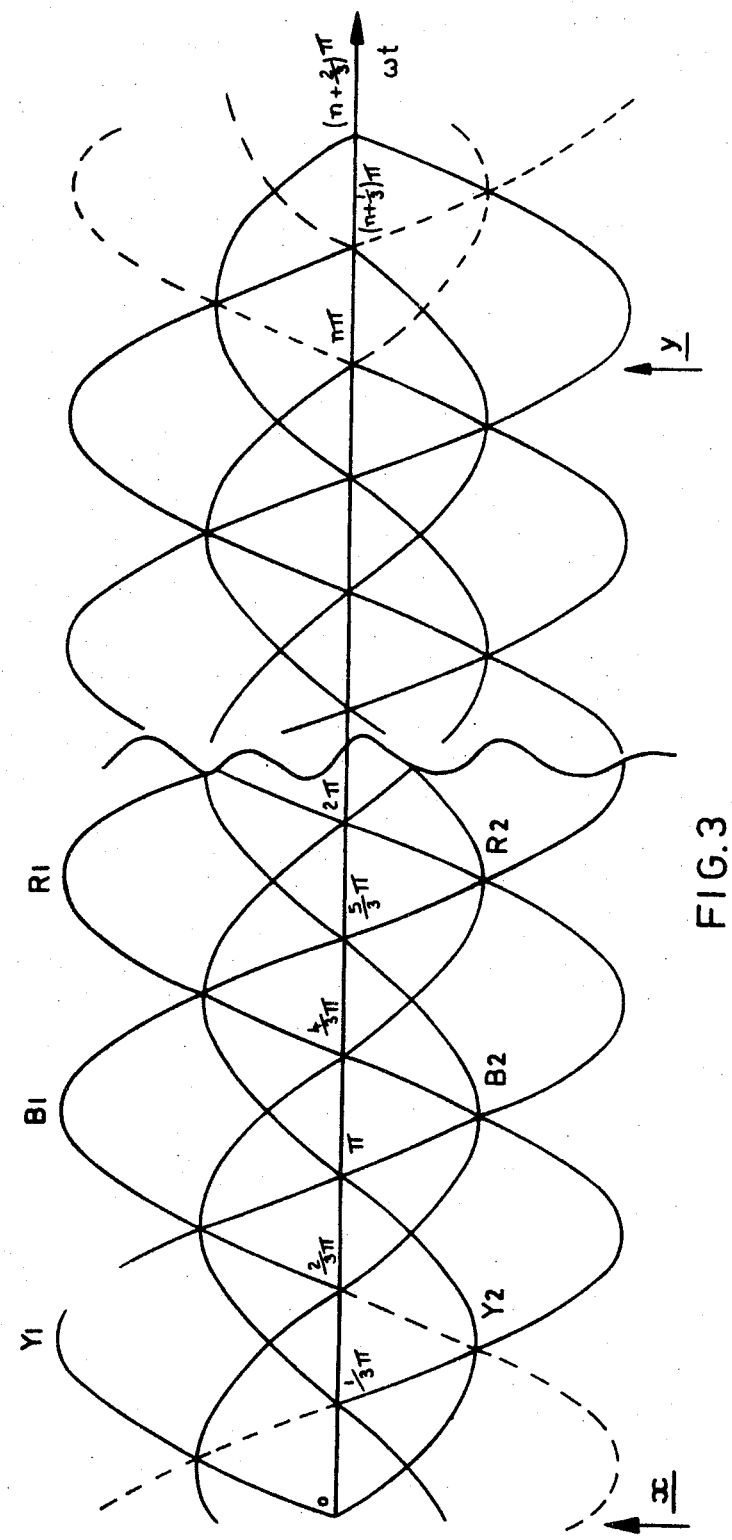
Figure 4:
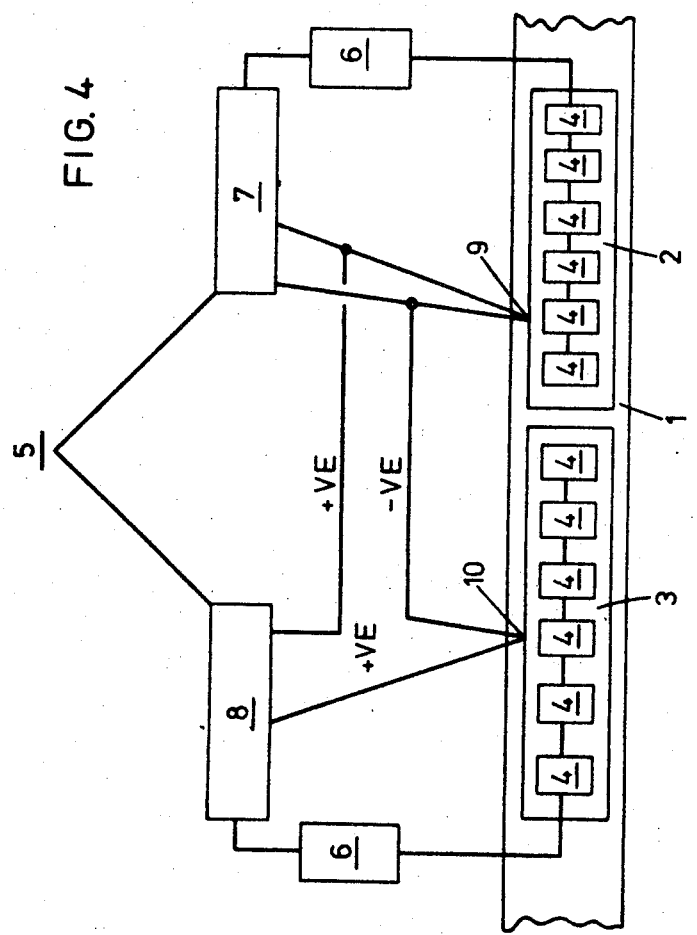
Figure 5:
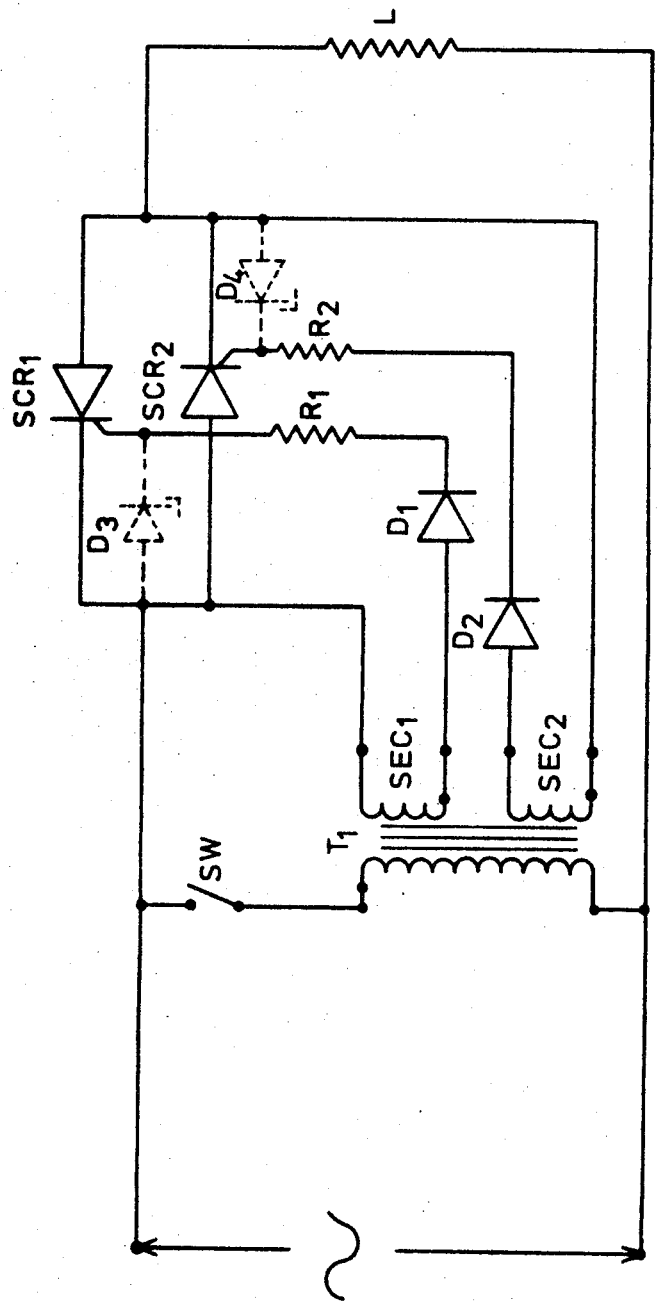

The invention will now be described, by way of example only, with reference to the accompanying drawings, in which:

FIG. 1 discloses a basic circuit wherein a three-phase supply to a three-phase electrical load is controlled, FIG. 2 discloses the phase relationship of phase supply voltages and transformer output voltages, FIG. 3 discloses the phase relationship at the time of switching on and switching off the circuit, FIG. 4 discloses a block diagram of a practical polyphase application of the invention, FIG. 5 discloses a basic circuit wherein a single phase supply to an electrical load is controlled, and FIG. 6 discloses the following waveforms of the circuit of FIG. 5:

6A $T_1$ primary waveform
6B $T_1$ secondary waveform
6C $SCR_2$ gate waveform
6D $SCR_1$ gate waveform For ease of understanding a polyphase system, we are describing a three-phase system in which the following three assumptions are made:

Mains sequence is R (Red) — Y (Yellow) — B (Blue)
Phase — Retard firing of S.C.R.'s.
Switch $S_1$ — Closed at Y phase 0 positive going.

In FIGS. 2 and 3, $R_1$, $Y_1$ and $B_1$ represent the phase voltages, and $R_2$, $Y_2$ and $B_2$ represent the transformer output voltages.

When $S_1$ (FIG. 1) is closed at time $x$ on FIG. 3, the primary of a transformer $T_1$ is connected between Y phase and neutral. It will be seen from FIG. 2 that during the positive half cycle of the Y phase, both R and B phases pass through zero voltage, R at $\frac{1}{3}\pi$ and negative going, B at $\frac{2}{3}\pi$ and positive going. As the voltages induced in the secondaries of $T_1$ are negative, and the R phase cross-over is negative going during this first half cycle of the Y phase, the secondaries of $T_1$ are used to fire the R phase S.C.R.'s (i.e. phase retard firing).

As the voltage of the Y phase rises from 0 a D.C. voltage is applied to S.C.R.$_1$ gate from the secondary of $T_1$ (A.B.) via a rectifier $D_1$ and the current limiting resistor $R_1$. However, even though the gate voltage of S.C.R.$_1$ quickly rises to the firing potential, S.C.R.$_1$ will not conduct before the R phase reaches 0, as it is reverse biased. As soon as the R phase passes through 0 at $\omega t = \frac{1}{3}\pi$, S.C.R.$_1$ becomes forward biased, and as there is still a D.C. potential applied to its gate, S.C.R.$_1$ will now conduct, allowing power to flow in a load $L_1$ and a transformer primary $T_2$.

The voltage of transformer $T_2$ primary rises negatively and feeds a voltage to S.C.R.$_2$ gate from $T_2$ secondary (C.D.) via $D_2$ and $R_2$, bringing S.C.R.$_2$ into condition to conduct as soon as the B phase passes through 0 on its positive going sweep at $\omega t = \frac{2}{3}\pi$. This allows power to flow in a load $L_2$ and the primary of a transformer $T_3$.

The positive voltage build up in $T_3$ is fed to S.C.R.$_3$ gate from the transformer secondary (E.F.) via $D_3$ and $R_3$, bringing S.C.R.$_3$ into condition to conduct when Y phase passes through 0 on its negative slope at $\omega t = \pi$, thereby allowing power to flow in a load $L_3$.

At $\omega t = \pi$ the Y phase is at 0, therefore, the voltage at the gate of S.C.R.$_1$ is 0, and as the Y phase goes negative the voltage induced in $T_1$ secondary (A.B.) is blocked by $D_1$. However, S.C.R.$_1$ continues to conduct until the R phase voltage applied to it drops to 0 at $\omega t = (4/3)\pi$.

After $\omega t = \pi$, the voltage applied to $T_1$ is negative going, and as this rises a D.C. voltage is applied to S.C.R.$_4$ from $T_1$ secondary (G.H.) via $D_4$ and $R_4$, which brings S.C.R.$_4$ into condition to conduct as soon as the R phase passes 0, $\omega t = (4/3)\pi$, on its positive slope. Power is now passed through S.C.R.$_4$ to load $L_1$ and transformer $T_2$.

The voltage of $T_2$ now rises positively, supplying a D.C. voltage to the gate of S.C.R.$_5$ from $T_2$ secondary (I.J.) via $D_5$ and $R_5$, permitting S.C.R.$_5$ to fire at $\omega t = (5/3)\pi$, allowing the B phase to supply power to load $L_2$ and transformer $T_3$.

At $\omega t = (4/3)\pi$, the voltage to the gate of S.C.R.$_2$ is blocked by $D_2$, permitting S.C.R.$_2$ to turn off when the B phase drops to 0 at $\omega t = (5/3)\pi$.

As the B phase rises negatively a D.C. voltage is applied to the gate of S.C.R.$_6$ from $T_3$ secondary (K.L.) via $D_6$ and $R_6$, bringing S.C.R.$_6$ into condition to conduct as soon as the Y phase passes through 0 on its positive slope at $\omega t = 2\pi$.

The voltage to the gate of S.C.R.$_3$ was blocked by $D_3$ at $\omega t = (5/3)\pi$, so permitting S.C.R.$_3$ to switch off when the Y phase voltage drops to 0 at $\omega t = 2\pi$.

This series of events continues, switching the appropriate S.C.R.'s on and off at the zero voltage condition and maintaining full power to the three-phase load.

For the circuit to operate correctly it is essential that the transformer phasing is correct.

The description given was for retard firing but by reversal of the transformer primary connections phase advance firing would result.

The switch-off sequence is as follows:

When the switch $S_1$ is opened at time $y$ on FIG. 3, the voltage to the gate of S.C.R.$_1$ and S.C.R.$_4$ is removed, so that when the R phase passes through 0 the power to load $L_1$ and transformer $T_2$ is blocked. This removes the gate voltage from S.C.R.$_2$ and S.C.R.$_5$, so that when the B phase passes through 0, power is blocked from $L_2$ and $T_3$, removing the gate voltage from S.C.R.$_3$ and S.C.R.$_6$. As the Y phase subsequently passes through 0, power is load from laod $L_3$, completing the shut down in one half cycle.

A practical application of the invention, by way of example only, will now be described.

In a blade bonding process where different temperatures are required at different segments of a blade bonding rig, generally indicated at 1, and these temperatures are required to be kept constant, the present invention proved very successful.

The blade bonding machine 1 is divided into a number of sections and each section into two segments 2 and 3. Each segment is fitted with a plurality of heaters 4, and each segment is supplied separately from the three-phase mains supply 5, using the present invention 6 for controlling the power in each segment.

In each section one segment is controlled from a Programme Controller 7 and the other segment from a Deviation Controller 8, the Programme and Deviation Controllers being substituted for switch $S_1$ of the present invention, so that each set of heaters is supplied separately.

A thermocouple feedback 9 to the Programme Controller controls the temperature of the heaters supplied by the Programme Controller, and a parallel output from the Programme Controller circuit thermocouple, connected, in back to back relationship, with a thermocouple 10 in the heaters supplied by the Deviation Controller, ensures that the Deviation Controller switches that heater supply when a predetermined temperature difference is attained.

Duplicate circuitry is used in each section throughout the length of the blade bonding machine, though the operating temperatures, Programme and Deviation Controllers are set up as required for that particular section.

With reference to FIG. 5 for the operation of a single phase circuit the voltage of the secondary windings Sec. 1 and Sec. 2 of the transformer $T_1$ should be as high as possible, to ensure that the S.C.R.'s fire early enough in each half cycle to be switched when only a very small current can flow in the load L, thus avoiding R.F. radiation due to high current switching.

In single phase circuits it is not possible to arrange the switching of the supply at zero volts, i.e. cross-over point, with this type of firing circuit. The actual firing angle may vary from near zero to 90°, therefore, care must be exercised in the choice of secondary voltages of transformer $T_1$. This voltage must be high enough to fire the S.C.R.'s yet low enough to avoid breakdown of the S.C.R. gate from switch-on surges.

If the transformer secondary peak voltage is so low that the gate voltage just reaches the S.C.R. firing potential, firing of the S.C.R.'s will occur at 90° as this is the angle at which the input and hence the gate voltage, reaches maximum.

Though it is possible to have a very high voltage from the secondaries of transformer $T_1$, and a correspondingly high series resistance to limit the S.C.R. gate current, thereby achieving a low firing angle, it would be more advantageous to limit the peak voltage of the secondaries of transformer $T_1$ to the maximum gate voltage of the S.C.R. in use, and then choose a suitable value of series resistance for correct current limiting. Setting the upper voltage in this way will avoid breakdown of the S.C.R. gate due to excess voltage being applied if the switch S.W. is closed when the supply waveform is at or near a peak.

By way of am example we will consider the S.C.R. by Mullard BTY 34 — 400R in the circuit shown (FIG. 5).

Maximum gate voltage = 10 V. peak
Minimum gate voltage required to trigger all units = 3 V.
Maximum gate dissipation = 5 W. peak
Maximum gate current = 2 A. peak
Minimum gate current = 30 mA. peak
Maximum forward current = 10 A. R.M.S.
Therefore, $T_1$ Primary = 240 V. R.M.S.
Therefore, $T_1$ Secondaries = 7.07 V. R.M.S. = 10 V. peak
Gate circuit resistance = Resistance of secondary + forward resistance of diode + R
Therefore, Total gate circuit resistance $R_T$, taking extremities = 100Ω to 3.3Ω
With $R_T$ = 100Ω the maximum firing angle = Sin$^{-1}$(3/10) ≈ 17.5°
Therefore, Supply voltage at 17.5° = 340 × 0.30071 = 102 V. At full load 14.14A. peak load voltage = 340 V. peak
Therefore, $Z_L$ = (340/14.14) = 24Ω
Therefore, In the worst case load current at firing angle 17.5° = (102/24) = 4.25A. i.e. 30 percent of full load To bring the firing angle down to a more acceptable limit a transformer secondary voltage of a higher value may be used, e.g. 25 V. peak.

$$100Ω > R_T > 12.5Ω$$

With $R_T$ = 100Ω the maximum firing angle = Sin$^{-1}$(3/25) ≈ 7°
Supply voltage at 7° = 340 × 0.12 = 41 V.

$$Z_L = 24Ω$$

Therefore, In the worst case load current at firing angle 7° = (41/24) = 1.7 A. i.e. 12 percent of full load When reducing the firing angle in this way it is advisable to include some sort of protection for the S.C.R. This may take the form of a zener diode across the gate circuit as shown in FIG. 5 by the broken lines ($D_3$ and $D_4$).

Various amendments to the circuits will become apparent without deviating from the invention, e.g. the invention could be used for delta connected loads, triacs could be used in place of S.C.R.'s, in which case each transformer would require only one secondary and the diodes would be dispensed with, or by careful design and manufacture of the transformer the diodes and resistors could be dispensed with. $S_1$, though shown as a mechanical device, could equally well be a semiconductor switch controlled by any electronic device such as a cross-over point detector, burst firing module, or an adjustable on-off ratio controller. Half power can be supplied by the insertion of a switch in lieu of the resistor in one of the two secondaries in each transformer, permitting the same sense secondaries to be open circuited. The circuit, shown controlling a resistive load, could equally control a capacitive, inductive or the like load, and could also be utilised for the speed control of motors, thereby conserving power.

We claim as our invention:

1. A control circuit for switching single and polyphase supplies, said control circuit comprising thyristor means for controlling connection of electrical load means to the electrical supply, firing means for controlling triggering of said thyristor means such that the electrical load means is connected to the electrical supply at or near zero volts, and a single pole switching means located within a single phase of the supply for controlling energization of said firing means.

2. A control circuit for switching single phase electrical supplies, said control circuit comprising thyristor means for controlling the connection of electrical load means to a single phase electrical supply, firing means for controlling triggering of said thyristor means such that the electrical load means is connected to said single phase supply when the single phase supply voltage is near zero volts, and a single pole switch connected in series with said firing means across said single phase for controlling energization of said firing means.

3. A control circuit for switching polyphase electrical supplies, said control circuit comprising thyristor means located in each phase of a polyphase supply for controlling the connection of electrical load means to the supply, firing means associated with each phase for respectively triggering corresponding ones of said thyristor means, a single pole switching means for, when actuated, causing energization of a first said firing means, and means for connecting said thyristor means and said firing means such that energization of said first firing means causes triggering of a said thyristor means in the succeeding phase and triggering of that thyristor means causes energization of further firing means in the same phase and such that the firing means of each of the other phases triggers the thyristor means in each succeeding phase whereby each phase sequentially switches the succeeding phase, said sequential switching occurring as each phase passes through zero volts in both positive and negative senses.

4. A control circuit for switching polyphase electrical supplies, said control circuit comprising thyristor means located in each phase of a polyphase supply for controlling the connection of electrical load means to the supply, firing means associated with each phase for respectively triggering corresponding ones of said thyristor means, a single pole switching means for, when actuated, causing energization of a first said firing means, and means for connecting said thyristor means and said firing means such that energization of said first firing means causes triggering of a said thyristor means in the preceding phase and triggering of that thyristor means causes energization of further firing means in the same phase and such that the firing means of each of the other phases triggers the thyristor means in each preceding phase whereby each phase sequentially switches the preceding phase, said sequential switching occurring as each phase passes through zero volts in both positive and negative senses.

5. A control circuit as claimed in claim 1, wherein said firing means comprise transformer means having two independent, rectified and current limited outputs of opposed polarity.

6. A control circuit as claimed in claim 1, wherein said thyristor means comprise a plurality of silicon controlled rectifiers connected within each phase to switch positive and negative half cycles respectively.

7. A control circuit as claimed in claim 1, wherein said firing means comprises a transformer with a single secondary winding and said thyristor means comprise triacs.

8. A control circuit as claimed in claim 1, wherein said firing means comprise a transformer providing non-rectified, non-current limited control of said thyristor means.

9. A control circuit as claimed in claim 1, wherein said single pole switching means comprises a semiconductor controlled by a cross-over point detector.

10. A control circuit as claimed in claim 1, wherein said single pole switching means comprises a semiconductor controlled by a burst firing module.

11. A control circuit as claimed in claim 1, wherein said single pole switching means is a semi-conductor controlled by an adjustable ON/OFF ratio controller.

12. A control circuit as claimed in claim 1 for use in the speed control of motors.

13. A control circuit as claimed in claim 2, wherein a voltage control device is provided to protect said thyristor means.

14. A control circuit as claimed in claim 1, wherein further switching means are provided for isolating part of said firing means for supplying half power.

15. A control circuit as claimed in claim 1, for use in controlling power supplied to a blade bonding machine.

* * * * *